Nov. 30, 1954      E. F. SOUCY      2,695,800
ADJUSTABLE TELESCOPING TUBULAR STRUCTURE
Filed Jan. 26, 1951
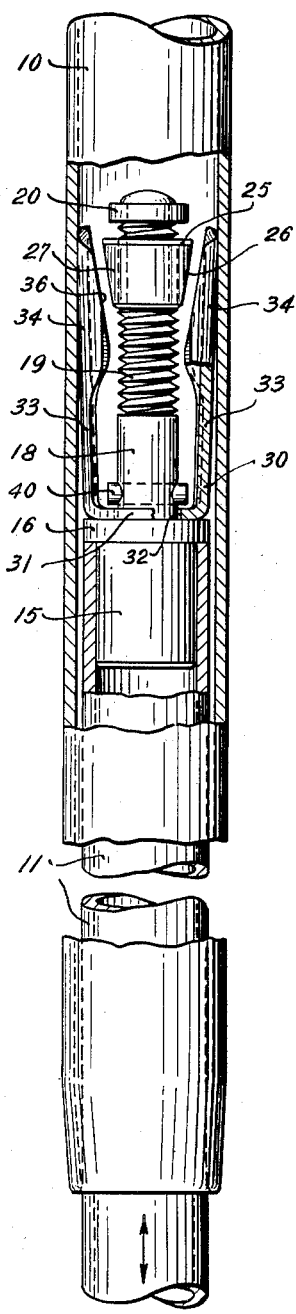
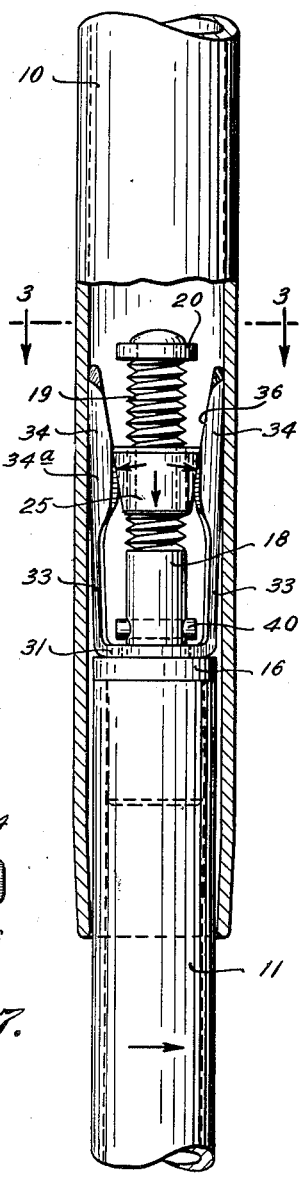
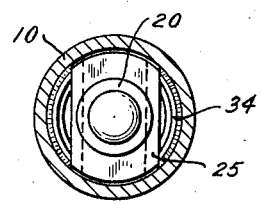
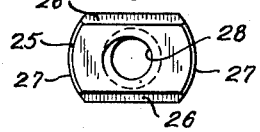
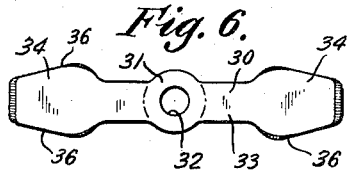
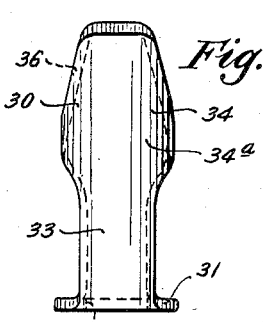
Inventor,
Ernest F. Soucy,
by Heard, Smith, Porter + Chittick,
Attys.

United States Patent Office 2,695,800
Patented Nov. 30, 1954

2,695,800

ADJUSTABLE TELESCOPING TUBULAR STRUCTURE

Ernest F. Soucy, Hanover, N. H., assignor to Dartmouth Skis, Inc., Hanover, N. H., a corporation of New Hampshire Application January 26, 1951, Serial No. 208,069

2 Claims. (Cl. 287—58)

This invention relates to adjustable telescoping tubular structure and locking means therefor for locking the tubular elements in adjustable positions. My device is adapted for use for a great many purposes wherever a longitudinal extensible tubular element is desired, which includes two or more telescoping tubes, with means for releasably locking the tubular members in any desired relative longitudinal position. Such uses include ski poles, camera tripods, movie screen tripods, music stands, table legs, lamp stands, canes, crutches, fishing poles, radio antennas, bicycle handle bars, pole vaulting poles and the like.

Heretofore many attempts have been made to provide devices of this nature, which would be satisfactory for all purposes, but so far as I am aware, they have not proved satisfactory or practical for one reason or another, or if suitable for one use would not be suitable for another. It is essential for such a device to be practical that it be simple and easy to operate, to lock and unlock quickly in an adjusted position, that it be strong and sturdy and hold great weight, if necessary, that it be reliable and certain in its operation, not readily broken, and that at the same time be simple and light in construction and inexpensive to manufacture. An adjustable ski-pole places the greatest demands on such a device, because it must possess all of these qualities to be satisfactory. Accordingly, I have designed my device primarily for use as a ski-pole, and to meet all the requirements of a ski-pole, such as lightness, great strength, simplicity of construction and ease of locking and releasing in adjusted position, but as stated above, its use is not thus limited.

The advantages of such an adjustable ski-pole are many, since skiers like to use a larger pole in climbing up-hill, than in running down-hill, and in cross-country running a medium height pole is more desirable. Further, one set of poles can be adjusted to the style of skiing of the individual skier, for the Austrian or Swiss down-hill skiers use a comparatively shorter pole than the Italian and French, and the Scandinavian skiers use a longer pole than anyone else. At present, since no adjustable ski-pole with which I am familiar meets all the requirements of a satisfactory pole, ski shops must in consequence carry four to six sizes of ski-poles. But with my adjustable pole, only one standard size need be carried.

Briefly my device comprises two telescoping tubular members, the inner member necessarily being smaller in diameter than the outer member to telescope into the latter. A plug is fixed in the upper and telescoping end of the inner member, and a threaded bolt is provided in the plug and extends co-axially from the inner member. A wedge-shaped nut is threaded on the bolt, and a spring member is loosely supported on the bolt having upwardly extending clamping jaws, the clamping jaws being provided with an inclined inner surface to be engaged by the wedging nut as the inner tubular member (and bolt thereon) is rotated relatively to the outer tubular member. By such movement the wedging nut is screwed down on the bolt, wedging the clamping jaws tightly against the inside wall of the outer tubular member, and locking the two members in fixed longitudinal relation. To release the members, the inner tubular member is rotated in the opposite direction, whereby the wedging nut is screwed upwardly on the bolt and out of wedging relation with the clamping jaws.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 1 is a front elevation partly in section showing the structure of my device in its unlocked position;

Fig. 2 is a similar view showing my structure in its locked position;

Fig. 3 is a horizontal section on line 3—3 of Fig. 2;

Fig. 4 is a side elevation of the wedging nut;

Fig. 5 is a bottom view of the wedging nut;

Fig. 6 is a plan view of the clamping jaw blank; and

Fig. 7 is a side elevation of the spring clamping jaw member with the jaws bent in the locking position.

In the drawings 10 represents the outer tubular member and 11 represents the inner tubular member which telescopes into the outer member 10, and is necessarily of smaller diameter. The inner and outer members 10 and 11 are rotatable relatively to each other. Locking means is provided for locking the outer and inner members together in extended longitudinal relation as may be desired which includes a plug 15 press fitted or otherwise rigidly fixed into the upper end of inner tubular member 11. Plug 15 has a collar or flange 16 which extends over the top edge of inner tube 11 and is preferably of the same external diameter. A bolt 18 is rigidly fixed in plug 15 and extends upwardly and co-axially into the interior of outer tube 10, and is provided with a threaded portion 19 at its upper end which thread, as shown in the drawings (Figs. 1 and 2), is a right-hand thread. A head 20 is provided on the top of the bolt 18 to prevent the wedging nut 25 (described below) from being unscrewed from the bolt 18.

The wedging nut 25 comprises a block of metal, preferably longer than wide, having longitudinal sides 26 and curved ends 27 and drilled as at 28 and tapered as at 26 with complementary threads to screw on the thread 19 of the bolt 18. The longitudinal sides 26 incline or slope downwardly from top ot bottom (as shown in Fig. 1).

A spring clamping member 30 is further provided which includes a base 31 with a central aperture 32 therein, shank portions 33 and a pair of clamping jaws 34. As shown in Figs. 1, 2 and 7, the spring clamping member 30 has its shank and jaw portions 33 and 34 bent upwardly at slightly less than right angles to the base portion 31, and clamping jaws 34 are bent into arcuate shape whereby the outer surface of the clamping jaw 34a conforms in shape to the radius of the surface of outer tubular member 10. Clamping jaws 34 are substantially wider than shank portion 33, forming sides 36 which are provided with an inclined surface sloping downwardly and outwardly from top to bottom of the clamping jaw 34. The angle of inclination of the sloping surface 36 of the clamping jaws 34 is preferably complementary to the angle of the sides 36 of the wedging nut 25.

To assemble the locking mechanism, the plug 15 with bolt 18 rigidly mounted therein is first rigidly fitted into the top end of inner tubular member 11, the spring clamping member 30, bent into proper shape, is then loosely mounted on the bolt 18 by extending the bolt through the aperture 32 in the base portion of the clamping member 30. A pin 40 is positioned in a suitable horizontal hole drilled in the bottom portion of the bolt 18. Wedging nut 25 is then screwed on the bolt 18 with its curved ends 27 extending into the open slots between the clamping jaws 34 of the clamping member 30. The head or cap 20 is then provided or formed on bolt 18 to prevent nut 25 from becoming unscrewed from the bolt 18. The inner tubular member 11 is then inserted in the outer tubular member 10 into position as shown in Fig. 1. It will be understood that spring clamping member 30 is free to rotate about the vertical axis of bolt 18. Bolt 18, as previously stated is rigid with plug 15 and inner tubular member 11. The spring tension of clamping jaws 34 is such that the outer arcuate surface thereof frictionally engages the interior surface of the outer tubular member 10. The length of wedging nut 25 along longitudinal side 26 is such that as the inner tubular member is rotated in a clockwise direction relative to outer tubular member 10 which is held fixed in one's hand, that bolt 18 is rotated, but wedging nut 25 is held against rotation by the sloping surface 36 of clamping jaws 34. Further rotation of inner tubular member 11, with bolt 18 attached thereto causes wedging nut 25 to be screwed downwardly on threads 19 of bolt 18, and further rotation causes the sloping sides 26 of wedging nut 25 to press against the sloping surface 36 of clamping jaws 34, thereby pressing clamping jaws 34 firmly against the interior side of outer tubular member 10, and to hold outer and inner tubular members 10 and 11 firmly locked in extended longitudinal position. It will be obvious that if the threads 19 of bolt 18 were left-hand threads, that inner tubular member 11 would be rotated in a counter-clockwise direction relative to outer tubular member 10 to accomplish the same locking device. To release and unlock the outer and inner tubular members 10 and 11, the inner tubular member is merely rotated in the opposite direction, with respect to the outer tubular member 10.

It will thus be seen that my telescoping tubular members may be firmly locked in adjustable position as desired and readily released therefrom by a quick rotation of the inner tubular member 11. The locking mechanism is simple, rugged and certain in operation.

I claim:

1. An adjustable tubular structure comprising two telescoping tubular members, the inner member being slightly smaller in exterior diameter than the interior diameter of the outer member, said members being capable of relative rotary and axial movement, a plug fixed in the upper and telescoping end of said inner member, a threaded bolt rigidly fixed in said plug and extending coaxially away from said inner tubular member, the free end of said bolt having an enlarged head, a spring clamping member rotatably mounted on said bolt, said clamping member having expandable clamping jaws extending away from said inner tubular member along the inner surface of said outer member, restraining means carried by said bolt cooperating with said plug to prevent axial movement of said clamping member relative to said bolt, and a wedging nut threaded on said bolt between said enlarged head and said restraining means, said wedging nut having sides that slope inwardly and downwardly and engage said clamping jaws, so as to restrain said nut against rotation relative to said jaws, said nut acting to expand said jaws into tight frictional engagement with the inner surface of said outer tubular member as said inner tubular member is rotated in a predetermined direction relative to said outer member, whereby to lock said tubular members against relative axial movement.

2. An adjustable tubular structure comprising two telescoping tubular members, the inner member being rotatable relative to the outer member, a threaded bolt having an enlarged head at one end and fixedly secured at its opposite end to the telescoping end of said inner member, said bolt extending coaxially away from said inner member, a wedging nut threaded on said bolt, said nut having sides that slope inwardly toward said inner member, and a spring clamping member rotatably carried by said bolt, said bolt being provided with means preventing axial movement of said clamping member relative to said inner tubular member and said bolt, said clamping member comprising a pair of clamping jaws having inclined surfaces engaging the sloping sides of said nut and holding said nut against rotation relative to said jaws, said nut being movable axially to expand said jaws into gripping engagement with said outer tubular member when said inner tubular member and said bolt are rotated relative to said outer tubular member.

References Cited in the file of this patent

UNITED STATES PATENTS

| Number | Name | Date |
|---|---|---|
| 1,071,307 | Gangloff | Aug. 26, 1913 |
| 1,238,423 | Matthey | Aug. 28, 1917 |
| 1,959,439 | McIntosh | May 22, 1934 |
| 2,290,400 | Wirgin | July 21, 1942 |
| 2,291,748 | Neuwirth | Aug. 4, 1942 |
| 2,431,069 | Mitchell | Nov. 18, 1947 |
| 2,490,369 | Neuwirth | Dec. 6, 1949 |
| 2,503,997 | Miller | Apr. 11, 1950 |
| 2,542,967 | Waechter | Feb. 20, 1951 |